United States Patent [19]
Yamane et al.

[11] Patent Number: 5,149,548
[45] Date of Patent: * Sep. 22, 1992

[54] APPARATUS FOR FORMING THREE-DIMENSION ARTICLE

[75] Inventors: Mitsuo Yamane, Yotsukaichi; Takashi Kawaguchi, Aichi both of Japan

[73] Assignee: Brother Kogyo Kabushiki Kaisha, Aichi, Japan

[*] Notice: The portion of the term of this patent subsequent to Oct. 22, 2008 has been disclaimed.

[21] Appl. No.: 539,192

[22] Filed: Jun. 18, 1990

[30] Foreign Application Priority Data

Jul. 3, 1989 [JP] Japan .................... 1-169951

[51] Int. Cl.⁵ .................... B29C 35/08; B05B 7/06; H05B 1/00
[52] U.S. Cl. .................... 425/174.4; 118/315; 118/323; 264/22; 264/25; 156/356; 156/380.9
[58] Field of Search ............. 118/669, 697, 315, 323; 264/22, 25, 245, 255, 308; 156/272.2, 272.8, 273.3, 275.5, 275.7, 356, 380.9; 425/90, 105, 174.4, 404; 364/468, 522; 427/54.1

[56] References Cited

U.S. PATENT DOCUMENTS

| | | | |
|---|---|---|---|
| 4,665,492 | 5/1987 | Masters | 425/174.8 X |
| 4,808,639 | 2/1989 | Chernack | 523/211 |
| 4,915,757 | 4/1990 | Rando | 156/64 |
| 4,961,972 | 10/1990 | Shimizu et al. | 427/388.1 |
| 5,000,636 | 3/1991 | Wallace | 156/275.5 X |
| 5,015,424 | 5/1991 | Smalley | 156/273.3 |
| 5,059,266 | 10/1991 | Yamane et al. | 156/64 |

Primary Examiner—David A. Simmons
Assistant Examiner—Chester T. Barry
Attorney, Agent, or Firm—Oliff & Berridge

[57] ABSTRACT

An apparatus and a method for forming a three-dimensional article with two-part curable material on the basis of a three-dimensional information on the article by means of an ink jet method. The material is jetted from at least one ink jet to a stage and laminated thereon. In two-part curable material, microcapsules which encapsulate setting material of the two-part curable material are scattered. These microcapsules are ruptured by radiation of light and so on. The laminated two-part material is supplied with radiation of light from a light source so that it is cured. In this process, a jetting direction of the material from the ink jet head to the stage and/or a jetting amount of the material jetted from the ink jet head is changed in accordance with the information by a control unit, thereby forming a solid article having a desired three-dimensional shape.

13 Claims, 3 Drawing Sheets

APPARATUS FOR FORMING THREE-DIMENSION ARTICLE

BACKGROUND OF THE INVENTION

This invention relates to an apparatus and a method for forming a solid or three-dimensional article, and more particularly to an apparatus and a method for forming a three-dimensional article in which two-part curable material is jetted by an ink jetting method, and cured while sequentially or intermittently laminated on a stage.

There has been conventionally utilized an apparatus using photocurable material as shown in FIG. 1, a well-known injection molding apparatus and a cutting tool in order to form a three-dimensional article using resin material.

In the conventional apparatus as shown in FIG. 1, a three-dimensional model for a solid article (a three-dimensional information on the article) is beforehand obtained by means of CAD(Computer Aided Design). The three-dimensional model is sliced into plural thin sectional layers (information) each representing each of plural sectional articles whose assembly constitutes the solid three-dimensional articles. In accordance with data of each thin sectional layer, a control computer 61 drives an X,Y-axes control device 62 for controlling a movement of a laser source 64 on a X-Y plane and a Z-axis control device 63 controlling a movement of the laser source 64 in the Z-direction. Simultaneously with the driving of the X,Y-axes control device 62 and the Z-axis control device 63, the laser light source 64 irradiates a laser beam to the surface of liquid photosetting resin 66 accommodated in a tank 65 while scanning the surface 67 of the photosetting resin 66 with the laser beam thereby drawing a pattern representing the sectional shape of each sectional article on the liquid surface of the resin 66 in accordance with the data from the control computer 61 with the laser beam. A table 68 is provided in the tank 65 in such a manner as to be disposed beside the surface of the resin 66. The laser beam is irradiated toward the table, and thus the photosetting resin 66 which is exposed to the laser beam is phase-changed from liquid to solid on the table 68, that is, the photosetting resin 66 is cured on the table 68 by the laser beam, so that a sectional article corresponding to one layer of the sliced three-dimensional model is formed of the resin on the table 68 in the tank 65.

The table 68 is moved downwardly (in the Z-direction) by a distance corresponding to the thickness of one sectional article, and then the above process is repeated to form a next sliced sectional article on the previously formed sliced article. A number of sliced sectional articles are sequentially formed and laminated by the above process, so that a cured solid article 69 is finally formed on the table 68.

In the conventional apparatus thus constructed, as described above, the liquid photosetting resin is accommodated in the tank and the laser beam is applied to the photosetting resin accommodated in the tank. Therefore, the material such as photosetting resin for the article to be formed is limited to only a single material. This limitation of the material also causes the color of the article to be limited to one color. If the material of the article or the color thereof is required to be changed on the way of the process, it is necessary to discharge the whole liquid photosetting resin from the tank and exchange it for a new one. In this case, a cleaning process for the inside of the tank is further required. This cleaning process imposes a loss of time and a unnecessary cost on the apparatus. Further, in such an apparatus it is very difficult to control polymerization of the resin, and it is impossible to form the articles using materials which are uncured even by a radiation of light.

In an apparatus for forming a three-dimensional article, which has been proposed by the same applicant as this application, a material uncured by a radiation of light can be used to form a three-dimensional article, because a two part curable resin and a setting material therefor are jetted from different ink jet heads respectively, laminated and cured on a stage. However, in such an apparatus, at least two ink jet heads are required to cure one resin material. Accordingly, when plural kinds of material having the above property are used for forming a three-dimensional article, many ink jet head are required, and thus the apparatus is complex and difficult to be controlled.

Further, in the conventional injection molding apparatus, an injection mold for forming a resin article must be beforehand formed, so that time and cost required for forming the article are more increased. In addition, the following disadvantages occur in this apparatus: a number of injection molds are required for a specific case, for example, when a number of kinds and a small number of articles are manufactured, this apparatus is not suitable for such a case; various undesired portion such as a runner portion occur for a completed resin article, so that the resin at these portions must be removed from the article; an article having a hollow has a large limitation in structure; and much time is required for altering a material for the article. Accordingly, an article having a complete structure can not be easily and accurately formed for a short time at low cost by this apparatus.

Furthermore, the cutting tool causes a large amount of chips or scraps of resin, so that a large amount of the resin of the article remain which is undesired. In addition, the finally completed article is soiled by these chips or scraps, so that the article can not be accurately formed. In comparison with the injection molding apparatus and so on, this cutting tool requires more time for a forming process, and thus is not suitable for a manufacturing process for forming a large number of articles.

SUMMARY OF THE INVENTION

An object of the present invention is to provide an apparatus and a method capable of easily and accurately forming a three-dimensional article for a short time and at a low cost even if plural materials, which can not be cured by a radiation of light and of different kinds or colors are used.

Another object of the present invention is to provide an apparatus and a method for forming a three-dimensional article capable of preventing dripping and blurring of materials used for the article during a laminating process thereof.

In order to attain the above objects, according to one aspect of the present invention, an apparatus for forming a three-dimensional article on a basis of a three-dimensional information on the article with a two-part curable material and a setting material therefor, the setting material being encapsulated in microcapsules which are dispersed into the two-part curable material comprises a stage for mounting thereon the three-dimensional article to be formed, a dispersing unit for dispersing the microcapsules uniformly in the two-part curable material, an ink jet head unit for jetting to and laminating on the stage both of the two-part curable material and the microcapsule dispersed therein, a microcapsule rupturing unit for rupturing the microcapsules encapsulating the setting material therein to cure the two-part curable material on the stage, a control unit for changing at least one of a jetting direction of the two-part curable material jetted along a flight passage and a jetting amount of the material jetted from the ink jet head unit on the basis of the information to thereby control a jetting operation of the two-part curable material.

In the three-dimensional article forming apparatus thus constructed, the ink jet head unit is preferably disposed under the stage so as to upwardly jet the two-part curable material to the stage.

According to another aspect of the present invention, a method for forming a three-dimensional article with two-part curable material on the basis of a three-dimensional information on the article, comprises the steps of jetting the two-part curable material on a stage by a ink jet head to thereby laminate the material on the stage, changing at least one of a jetting direction and a jetting amount of the material jetted from the ink jet head in accordance with the information, thereby controlling a jetting operation of the material, and rupturing microcapsules encapsulating setting material of the two-part curable material to mix the two-part curable material and the setting material therefor and cure the two-part curable material, thereby forming the article.

According to the present invention, it is possible to use forming material which is uncured by light-radiation for forming three-dimensional article.

Further according to the present invention, since the plural ink jet heads are provided, a two-part curable material for the three-dimensional article can be exchanged for another even during an article forming process. Further, as the two-part curable material is jetted in a droplet form, polymerization of the two-part curable is easily controlled.

Moreover, according to the present invention, since the ink jet head is disposed under the stage, the two-part curable material is jetted from a downward side to an upward side and is cured every jetting process. Accordingly, there is an advantage that a newly-exchanged two-part curable material in the course of the process is not mixed with the previously-used two-part curable material, and thus the forming process is accurately performed without drop of the two-part curable material and contamination of different kinds of two-part curable materials.

DETAILED DESCRIPTION OF THE INVENTION

A preferred embodiment of this invention will be described hereunder with reference to the accompanying drawings.

Figure 1:
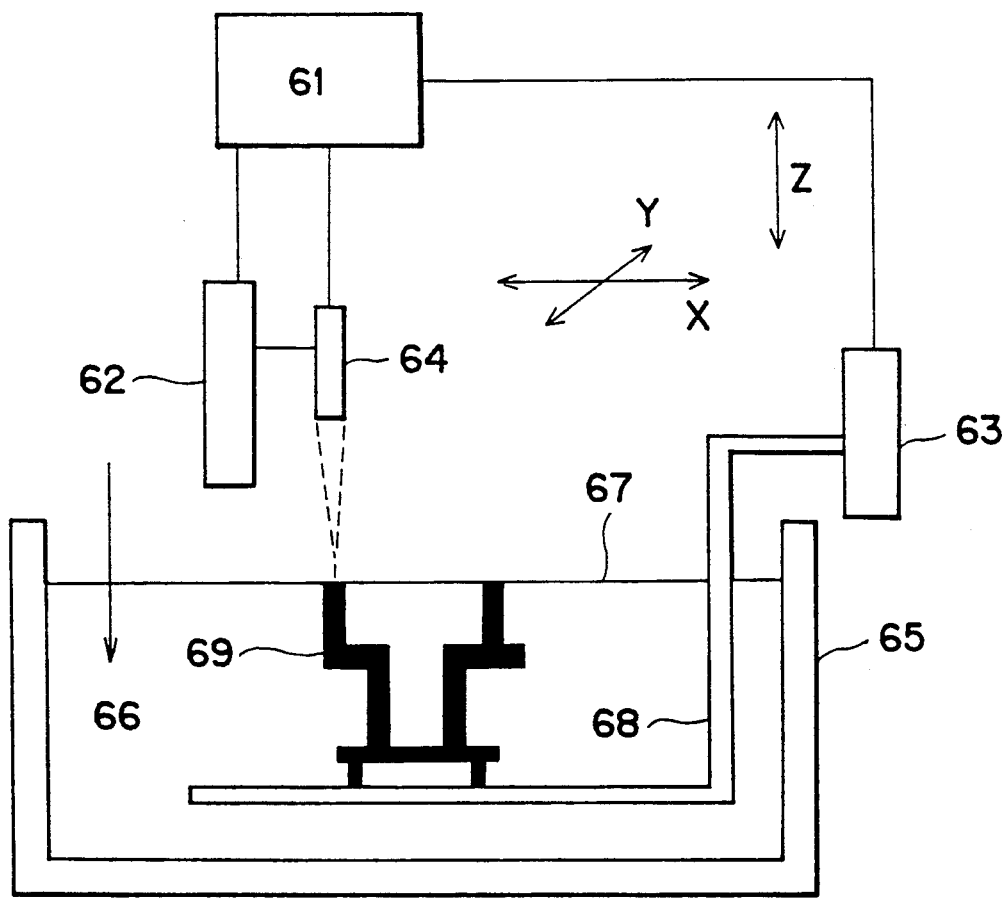
FIG. 1 is a schematic view of a conventional three-dimensional article forming apparatus.
Figure 2:
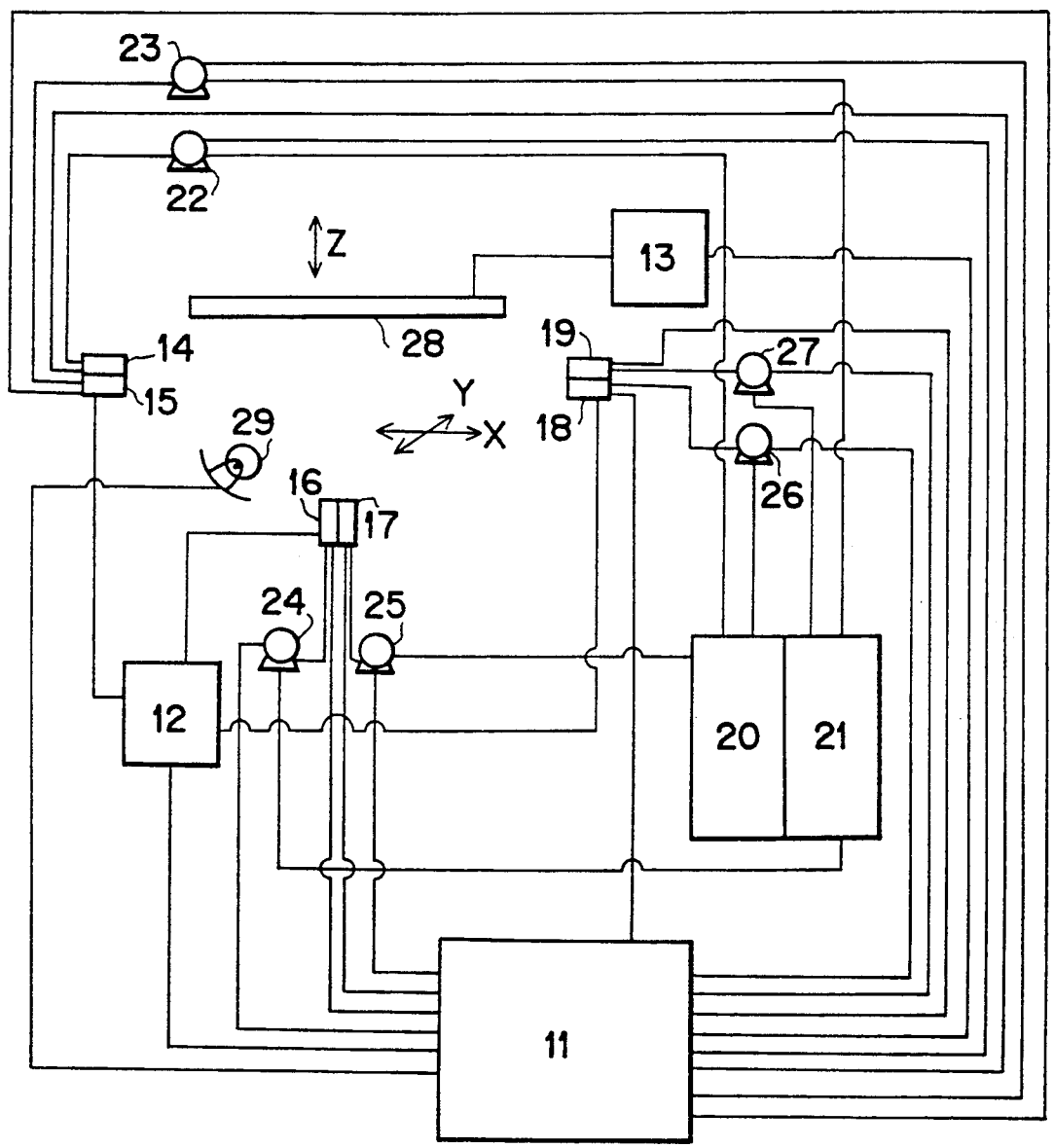
FIG. 2 is a schematic view of an embodiment of a three-dimensional article forming apparatus according to this invention.

A three-dimensional article forming apparatus according to a first embodiment is shown in FIG. 2 and basically comprises a control unit 11 comprising a computer for obtaining a three-dimensional model on the basis of an input information on a desired article and controlling each element of the apparatus for conducting a forming process in accordance with data of the model, a forming stage 28 on which a material such as a two-part curable material is laminated to form a three-dimensional (solid) article, a light source 29 for supplying light to microcapsules which encapsulate resin setting material, an ink jet head unit having plural ink jet heads 14 to 19 for jetting the two-part curable material on the stage 28, an X,Y-axes control device 12 for controlling a movement of the ink jet head unit in the X- and Y-direction (on the X-Y plane) and a Z-axis control device 13 for controlling a movement of the forming stage in the Z-direction, the X,Y-axes and Z-axis control devices 12 and 13 being used to control jetting and laminating directions of the two-part curable material, tanks 20 and 21 for accommodating the two-part curable materials, and pumps 22 to 27 for providing the two-part curable material in the tanks 20, 21 to ink jet head unit.

The two-part curable material is cured through a mixing process with the setting material encapsulated in the microcapsules. These microcapsules are uniformly dispersed in the two-part curable material in the tanks 20 and 21 by a agitator(not shown). The microcapsules can be ruptured by light-radiation. By rupturing the microcapsules, the setting material encapsulated therein is issued and mixed with the two-part curable material, whereby the two-part curable material is cured.

Figure 3:
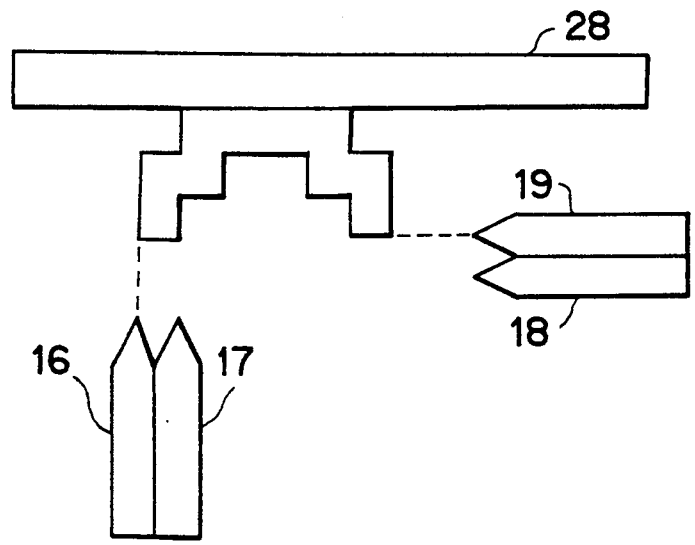
FIGS. 3 and 4 are explanatory views for forming an article using the apparatus as shown in FIG. 2.

An operation of the apparatus according to this embodiment will be described hereunder, for example, in a case where an article as shown in FIG. 3 is formed.

Figure 4:
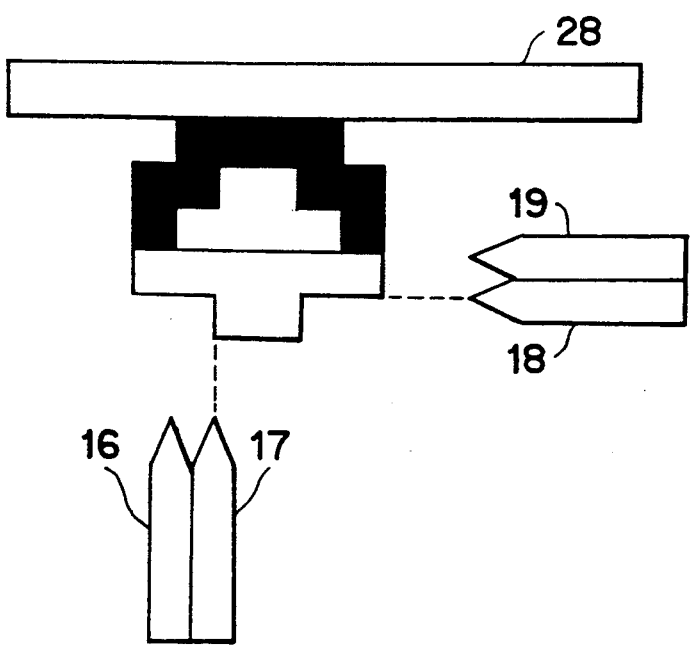

At a first stage, data on each sectional shape of a desired article is inputted to the control unit 11. On the basis of an instruction from the control unit 11, the X,Y-axes control device 12 and the Z-axis control device 13 are driven to move the ink heads 14 to 19 and the forming stage 28 disposed above the ink jet heads to predetermined positions, respectively. After these elements are moved, the control unit 11 outputs an instruction to the pump 24 to jet a two-part curable material A accommodated in the tank 21 from the ink jet head 16 to the forming stage 28 while the ink jet head 16 is moved in the X- and Y-directions and to laminate the jetted two-part curable material on the forming stage 28. Thereafter, the laminated two-part curable material is supplied with a radiation of light by a light source 29 by rupture and the microcapsules dispersed in the two part curable material. As a result, the setting material issued from the ruptured microcapsules is mixed to the two-part curable material and the two-part curable material is cured, thereby forming a first part of the article as shown in FIG. 4 on the stage 28.

At a next stage, the control unit 11 outputs another instruction to the pumps 23 and 27 to jet the two-part curable material A and its setting material encapsulated in microcapsules accommodated in the tank 21 from the ink jet heads 15 and 19 to the stage 28 while the ink jet heads 15 and 19 are moved in the X- and Y-directions. The two-part curable material is laminated on the previously-cued first part and then cured by the light-radiation from light source 29, so that a second part as shown in FIG. 3 is formed on the first part. Further, in accordance with another instruction from the control unit 11, the forming stage 28 is moved in the Z-direction by a distance corresponding to the thickness of each sectional article and the ink heads 16 and 17 are moved in the X- and Y-directions. Thereafter, the two-part curable material B accommodated in the tank 20 is jetted from the ink jet head 17 while the ink jet head 17 is moved in the X- and Y-directions, and laminated on the previously-cured first and second parts. The two-part curable material is cured by the light-radiation from the light source 29.

At a last stage, the control unit 11 outputs another instruction to the pumps 22 and 26 to jet the two-part curable material B and the setting material encapsulated in the microcapsules accommodated in the tank 20 from the ink jet heads 14 and 18 to the stage 28 while the ink jet heads 14 and 18 are moved in the X- and Y-directions, and then the two-part curable material is laminated on the previously-cured third part. The two-part curable material is cured by the light-radiation from the light source 29, so that the desired three-dimensional article is formed on the stage.

In the above embodiment, the two-part curable materials A and B may be different in kinds and/or colors from each other.

Further, in the above embodiment, one of the arrays of ink jet heads and/or the stage may be designed so as to be rotatable.

The two-part curable materials using in this embodiment are, for example, selected from following combinations.

(1) Formaldehyde resin of urea or melamine and P-toluenesulfonic acid catalyst.

(2) Epoxide resin and polyamide resin having tertiary amine or free radical amino groups.

(3) Polyisocyanate resin and plyester having many hydroxyl groups.

(4) Unsaturated polyester dissolved in styrenes and a reaction initiator such as a peroxide.

The microcapsules adopted in this embodiment are ruptured by a radiation of light from the light source.

However, a manner for rupturing the microcapsules is not limited to the light-radiation. For example when a heat-ruptured or pressure-ruptured material is used as microcapsules in this invention, it is possible to rupture the microcapsules by heat supplied from a heater or by a pressure supplied from a pressuring unit the microcapsules are jetted from the ink jet heads. Further, by using various different color or kind two-part curable material, a multikind of multi-color article may be formed.

This invention is not limited to the above embodiment, and any modification may be used insofar as the modification do not depart from the subject matter of this invention. For example, if a CAD/CAM/CAE system is introduced into the control unit 11 as described above, it is possible to increase a speed for the forming process and to improve a quality in design.

What is claimed is:

1. An apparatus for forming a three-dimensional article on the basis of three-dimensional information about the article with a two-part curable material and a setting material therefor, the setting material being encapsulated in microcapsules which are rupturable upon light radiation or heat radiation, the apparatus comprising:
    a stage for mounting thereon the three-dimensional article to be formed;
    a dispersing unit for dispersing the microcapsules uniformly in the two-part curable material;
    an ink jet head unit positioned below the stage for jetting the two-part curable material and the microcapsules dispersed therein toward said stage to laminate the two-part curable material and the microcapsules on the stage;
    a microcapsule rupturing unit for rupturing the microcapsules and to cure the two-part curable material laminated on said stage, the microcapsule rupturing unit comprising one of light applying means and heat applying means, the light applying means applying the light radiation toward the two-part curable material and the microcapsule dispersed in the two-part curable material jetted and laminated on the stage, and the heat applying means applying the heat radiation toward the two part-curable material and the microcapsules dispersed in the two-part curable material jetted and laminated on the stage;
    a control means for controlling said ink jet head unit in order to change at least one of a jetting direction of the two-part curable material and a jetting amount of the material jetted from the ink jet head unit on the basis of the information in order to control a jetting and laminating operation of the two-part curable material on said stage, and for controlling said microcapsule rupturing unit in order to rupture the microcapsules disposed in the two-part curable material laminated on the stage after the two-part curable material is laminated on said stage, said controlling means also controlling the repetition of the jetting operation of said ink jet head and the microcapsule rupturing operation of said microcapsule rupturing unit.

2. An apparatus as claimed in claim 1, wherein said ink jet head unit comprises at least two arrays of ink jet heads for laminating the material on the stage in different directions to each other, respectively.

3. An apparatus as claimed in claim 2, wherein said control unit includes first driving means for moving each of said arrays in two directions vertical to each other on a plane parallel to the surface of the said stage, and second driving means for moving said stage in a direction vertical to the plane.

4. An apparatus as claimed in claim 2, wherein said control unit includes first driving means for moving one of said arrays in two directions vertical to each other and second driving means for rotating the other array relatively to said stage around an axis vertical to the surface of said stage.

5. An apparatus as claimed in claim 4, wherein said control unit further includes third driving means for moving said stage in a direction vertical to the plane.

6. An apparatus as claimed in claim 4, wherein said control unit further includes third driving means for moving said stage in a direction vertical to the plane and rotating said stage around the axis.

7. An apparatus as claimed in claim 1, wherein said ink jet head is disposed under said stage so as to upwardly jet the material to the stage.

8. An apparatus for forming a multi-kind or multi-color three-dimensional article with plural two-part curable materials of different kinds or different colors and setting materials therefor on the basis of a three-dimensional information on the article, the setting materials for the two-part curable materials being encapsulated in the microcapsules rupturable upon light radiation, the apparatus comprising:

a stage for mounting thereon the three-dimensional article to be formed;

plural tanks for accommodating the different kind or color two-part curable materials;

plural ink jet heads positioned below said stage for jetting along respective flight passages of the materials toward said stage to individually laminate the two-part curable materials on said stage, the flight passages being defined between said stage and the ink jet heads;

a light supplying unit for irradiating light to the laminated two-part curable materials on said stage to rupture microcapsules in the two-part curable materials and to cure the two-part curable materials; and a control means for controlling said ink jet head unit in order to change at least one of a jetting direction of the two-part curable materials along the flight passages and a jetting amount of the materials jetted from said ink jet head unit on the basis of the information in order to control a jetting and laminating operation of the two-part curable materials on said stage, and for controlling said microcapsule rupturing unit in order to rupture the microcapsules dispersed in the two-part curable materials laminated on the stage after the two-part curable materials are laminated on said stage, said controlling means also controlling the repetition of the jetting operation of said ink jet head and the microcapsule rupturing operation of said microcapsule rapturing unit.

9. An apparatus as claimed in claim 1, wherein the three-dimensional information on the article comprises plural sectional positional data each representing a sliced sectional part of the article and a color data representing a color of the article to be formed.

10. An apparatus as claimed in claim 1, wherein the two-part curable material is formaldehyde resin of urea or melamine and a setting material therefor is P-toluenesulfonic acid catalyst.

11. An apparatus as claimed in claim 1, wherein the two-part curable material is epoxide resin and a setting material therefor is polyamide resin having a tertiary amine or free radical amino group.

12. An apparatus as claimed in claim 1, wherein the two-part curable material polyisocyanate resin and a setting material therefor is polyester having many hydroxyl groups.

13. An apparatus as claimed in claim 1, wherein the two-part curable material is unsaturated polyester dissolved in styrene and a setting resin therefor is a reaction initiator.

* * * * *